United States Patent [19]

Mayers

[11] Patent Number: 4,538,563
[45] Date of Patent: Sep. 3, 1985

[54] HELICAL COIL SPRING DAMPER ASSEMBLIES

[75] Inventor: Walter T. Mayers, West Bloomfield, Mich.

[73] Assignee: Peterson American Corporation, Southfield, Mich.

[21] Appl. No.: 647,125

[22] Filed: Sep. 4, 1984

[51] Int. Cl.³ .................................................. F01L 3/10
[52] U.S. Cl. .............................. 123/90.67; 123/90.65; 123/188 SA; 123/188 SB; 123/188 SC; 267/166
[58] Field of Search ............... 123/90.65, 90.66, 90.67, 123/188 SA, 188 SB, 188 SC, 188 S; 267/136, 140.1, 166, 167, 168

[56] References Cited

U.S. PATENT DOCUMENTS

| | | | |
|---|---|---|---|
| 1,191,658 | 7/1916 | Brown | 123/90.67 |
| 1,252,501 | 1/1918 | Shepherd | 123/90.67 |
| 1,331,826 | 2/1920 | Shepherd | 123/90.67 |
| 1,474,795 | 11/1923 | Shepherd | 123/188 N |
| 1,554,227 | 9/1925 | Nickol | 123/90.67 |
| 1,602,304 | 10/1926 | Heldt | 123/188 R |
| 1,659,528 | 2/1928 | Hosterman | 123/90.33 |
| 1,695,726 | 12/1928 | Woolson | 267/169 |
| 1,696,797 | 12/1928 | Fornaca | 267/169 |
| 1,711,267 | 4/1929 | Hutt | 123/90.37 |
| 1,840,128 | 1/1932 | Pfeiffer | 123/90.66 |
| 1,876,160 | 9/1932 | Zahodiakin | 123/41.33 |
| 1,928,678 | 10/1933 | Sjolander | 123/90.66 |
| 2,005,089 | 6/1935 | Krebs | 123/90.66 |
| 2,117,433 | 5/1938 | Krebs | 123/90.66 |
| 2,117,434 | 5/1938 | Krebs | 123/90.66 |
| 2,392,234 | 1/1946 | Downey | 251/125 |
| 2,613,656 | 10/1952 | Leach | 123/90.66 |
| 2,821,971 | 2/1958 | Benz et al. | 123/90.66 |
| 2,868,188 | 1/1959 | Havens | 123/188 R |
| 3,077,874 | 2/1963 | Bush | 123/188 R |
| 3,114,361 | 12/1963 | Mullen | 123/188 R |
| 3,793,999 | 2/1974 | Seiler et al. | 123/90.67 |
| 3,995,609 | 12/1976 | Klomp | 123/188 S |
| 4,479,461 | 10/1984 | Felice et al. | 123/90.65 |

Primary Examiner—Ira S. Lazarus
Attorney, Agent, or Firm—Harness, Dickey & Pierce

[57] ABSTRACT

An improved spring damper assembly is disclosed which comprises a helical coil spring having a generally cylindrically shaped sleeve member fitted thereto. The sleeve member has resilient sidewall portions which are designed to frictionally engage surfaces of the coil spring so as to dampen the oscillatory movement of the spring member whereby resonance of the spring is attenuated. The sleeve member includes a continuous integrally formed radially extending flange portion at one end thereof which overlies the end coil of the spring and operates to prevent excessive wear and/or gouging of the seating surface against which the spring is intended to bear due to rotational movement of the spring assembly during cyclic operation thereof.

11 Claims, 5 Drawing Figures

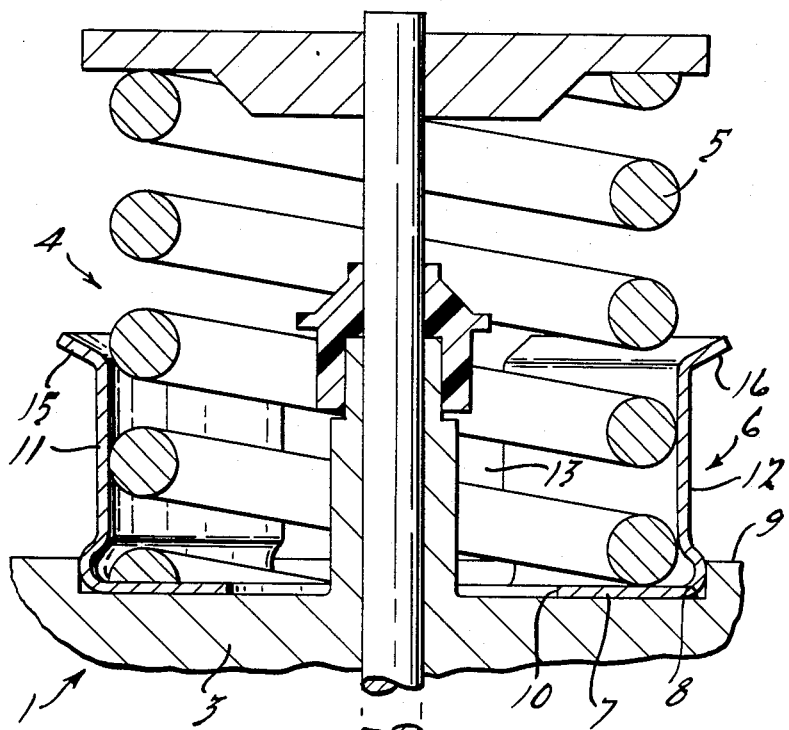
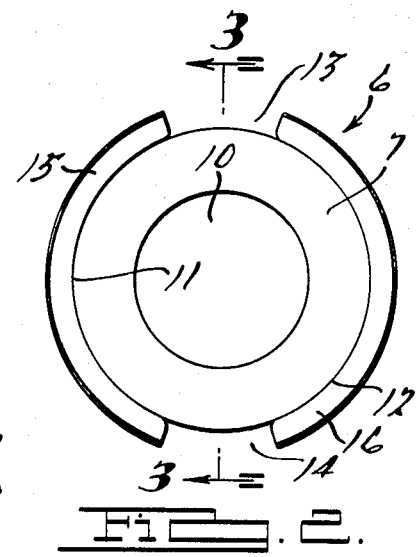
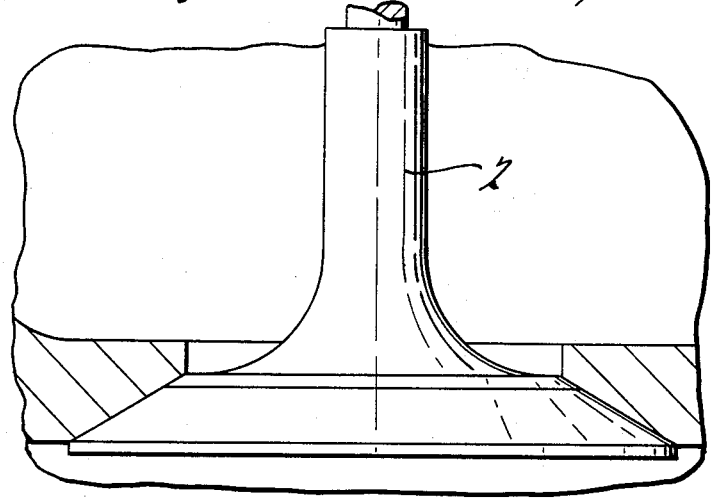
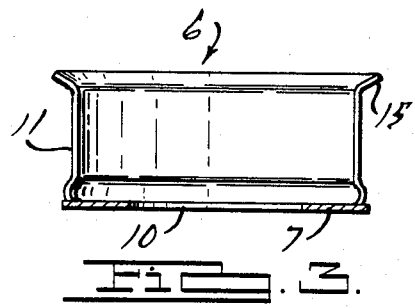
Fig. 1.
Fig. 2.
Fig. 3.

HELICAL COIL SPRING DAMPER ASSEMBLIES

BACKGROUND AND SUMMARY OF THE INVENTION

This invention relates to coil spring dampers and more particularly to helical coil spring dampers which operate to inhibit resonant oscillation of coil springs such as may occur in valve assemblies of internal combustion engines.

Helical coil springs have long been used to provide a biasing force for an object which must undergo reciprocal motion. Successful internal combustion engine designs have continuously featured helical coil springs to bias combustion chamber valves to a closed position. In a typical four cycle internal combustion engine for example, a combustion chamber valve is opened and closed once per two revolutions of the crankshaft. Thus, valve speed is directly proportional to engine speeds. At high engine speeds, valve springs have been known to resonate. Such resonance may result in erratic valve operation as well as possible damage to the engine and/or valve spring and in general impaired engine performance.

Various techniques have been used to eliminate valve resonance. One such technique is to increase the force and/or the constant of the helical coil spring. The disadvantage of this solution is that the required valve actuator force is increased, thereby increasing internal energy losses resulting in increased fuel consumption and increased valve train wear.

Another technique is to shroud the helical coil spring with a sleeve anchored by prong-like members between the helical coil spring and the spring seat. Such a construction is shown in related application Ser. No. 398,501, filed July 15, 1982, U.S. Pat. No. 4,479,461 entitled "Coil Spring Damper For Valve Assemblies Of Internal Combustion Engines And The Like". While this arrangement does effectively attenuate resonant oscillation of the coil spring, the edges of the radially extending prongs have a tendency to gouge or machine the spring seating surface of the cylinder head surrounding the valve stem. This machining action results from the inherent rotational movement of the valve spring and associated damper during repetitive actuation thereof. This wearing or machining of the valve spring seating surface may result in contamination of the lubrication oil with metal particles as well as possibly eventually result in reduction of the spring biasing force required for proper operation of the valve. This is of particular concern with head assemblies fabricated from aluminum alloys but is an undesirable condition in any application.

Accordingly, the present invention provides a coil spring damper assembly which overcomes the disadvantages associated with this prior construction by incorporating a continuous annular spring seat engaging surface on the axial end of the cylindrical damper sleeve thus eliminating the presence of any radially extending edges which may result in excessive wear of the seating surface. The cylindrical member is constructed to be mounted about the helical coil spring and to frictionally engage the outer periphery of a plurality of the helical coil spring coils. The cylinder when mounted about a portion of the helical coil spring exerts a radial resilience to dimensional variations in the helical coil spring during compression and expansion. Such engagement between the sleeve and portions of the helical coil spring dampens the helical coil spring motion thereby increasing the valve resonant frequency without significantly increasing internal engine power losses.

Additional objects, advantages and features of the present invention will become apparent from the subsequent detailed description of the preferred embodiments and appended claims taken in conjunction with the accompanying drawings.

BRIEF DESCRIPTION OF THE DRAWINGS

FIG. 1 is a fragmentary sectional view of a valve assembly for an internal combustion engine showing the spring damper assembly of the present invention in operative relationship to a valve and associated head.

FIG. 2 is a plan view of the cylindrical damper sleeve forming a part of the present invention.

FIG. 3 is a sectional view of the damper sleeve of FIG. 2, the section being taken along line 3—3 thereof.

DETAILED DESCRIPTION OF THE PREFERRED EMBODIMENT

Figure 4:
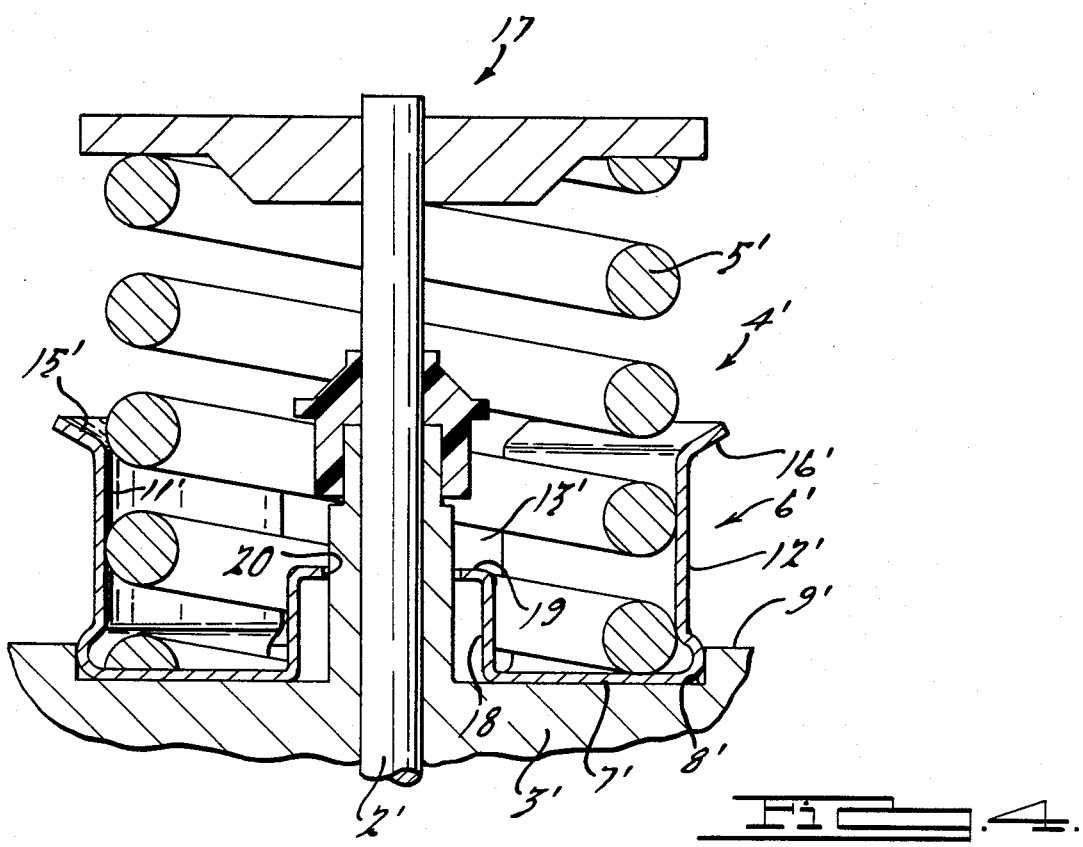
FIG. 4 is a fragmentary sectional view similar to that of FIG. 1 but featuring an alternative embodiment of the helical coil spring damper assembly of the present invention.

Referring to FIG. 1, a single valve assembly for an internal combustion engine is shown being generally indicated by reference number 1 and includes a valve member 2 movably disposed within a head 3. A spring damper assembly 4 is provided being positioned in coaxial relationship to valve member 2 and operates to bias valve member 2 into a closed position with respect to head 3 as shown.

Spring damper assembly 4 comprises a helical coil spring 5 to which is fitted a generally cylindrically shaped sleeve 6. Helical coil spring 5 is preferably of conventional construction and of a suitable size and strength for the intended application.

As best seen with reference to FIGS. 2 and 3, sleeve 6 has a generally planar radially extending bottom (as shown) flange portion 7 which is adapted to seat against a recess 8 provided in surface 9 of head 3. A relatively large diameter center opening 10 is provided in flange 7 to accommodate the upwardly extending valve stem guiding portion of head 3.

As shown, a pair of integrally formed sidewalls 11 and 12 extend axially from the outer periphery of flange 7 along the outer periphery of helical coil spring 5. Sidewalls 11 and 12 each extend circumferentially a substantial distance around the periphery of flange 7 with the respective opposite axial edges thereof being positioned in spaced opposed relationship so as to define axially extending diametrically opposed slots 13 and 14. It should be noted, however, that in some applications it may be desirable to incorporate additional axially extending slots or alternatively only a single such slot. Preferably, the axially extending edges of each of sidewalls 11 and 12 will be flared radially outwardly slightly so as to avoid the possibility of their nicking or gouging of the outer periphery of spring 5. Similarly, the circumferentially extending edges 15 and 16 located remote from flange 7 are flared radially outwardly slightly so as to avoid marring of the spring coils as well as to facilitate both assembly and operation of sleeve 6 to spring 5.

Preferably, sidewalls 11 and 12 will be of substantially equal length and sufficient to extend over a desired plurality of coils of spring 5. Also the inside diameter defined between sidewalls 11 and 12 prior to assembly will preferably be slightly less than the outside diameter of coil spring 5 thus assuring a frictional engagement between the outer periphery of the respective coils of spring 5 against the inner surface at substantially all times including when the valve member 2 is biased into a closed position.

Upon compression of the helical coil spring 5, coils already within sleeve 6 frictionally slide downward and additional coils of helical coil spring 5 enter the sleeve 6. Radially flared edges 15 and 16 serve to align such entering coils with sleeve 6 so as to insure smooth full operation of helical coil spring 5. Such frictional engagement between sleeve 6 and the coils of helical coil spring 5, dampen the motion of the coil spring, thereby altering the resonant frequency thereof so as to place it outside of the range of normal engine operation. Because flange 7 provides a continuous annular surface which bears against the bottom of recess 8, thereby eliminating the presence of radially extending edges, the possibility of the bottom surface of recess 8 being subject to excessive wear or machining action is substantially eliminated.

Referring now to FIG. 4, another valve assembly incorporating an alternative embodiment of the present invention is shown being indicated generally at 17 and wherein corresponding identical elements are indicated by like numbers primed. As seen therein sleeve 6' is substantially identical to sleeve 6 with the exception that a generally axially inwardly extending projection 18 is provided being centrally located on flange 7 and integrally formed therewith. Projection 18 is generally cylindrical in shape and extends only partially over the axial length of sleeve 6'. A generally radially extending flange 19 projects inwardly at the upper end thereof and defines an opening 20 through which the valve stem guide portion of the head 3' extends. The axially inwardly extending inner surfaces of projection 18 may be desirable to aid in the assembly of and/or to aid in assuring and maintaining proper seating of the spring damper assembly in certain applications.

Figure 5:
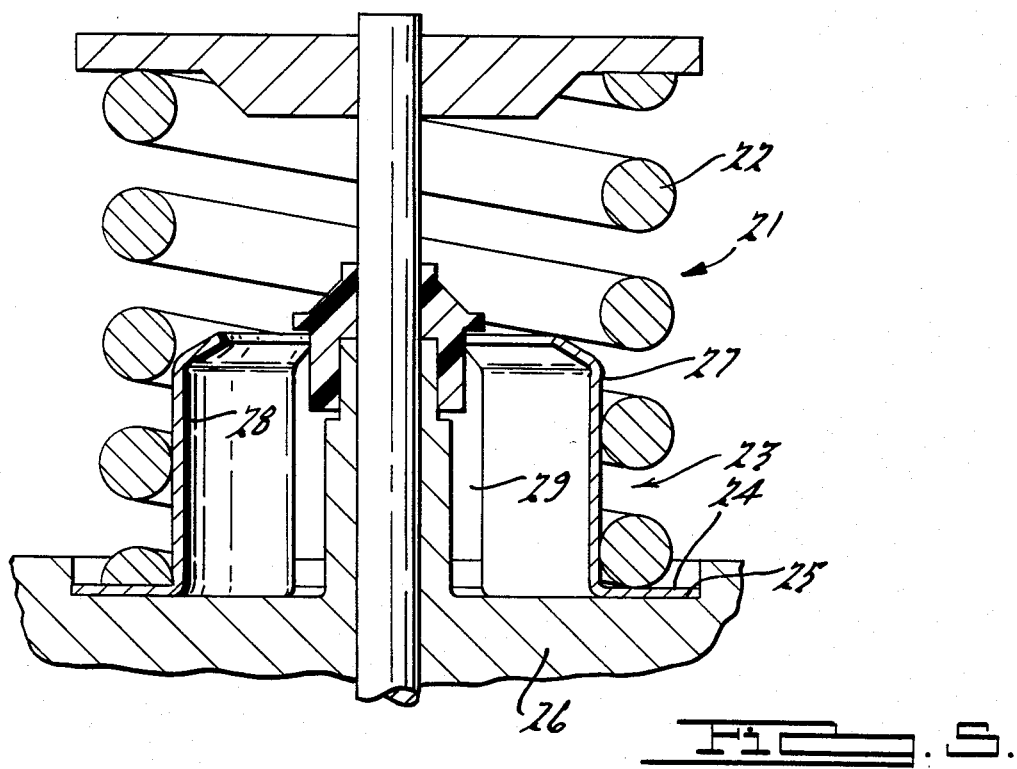
FIG. 5 is also a fragmentary sectional view similar to that of FIG. 1 but featuring yet another embodiment of the present invention.

In some applications it may be desirable to position damper sleeve 6 in engagement with the inner surfaces of coil spring 5. Such an embodiment is illustrated in FIG. 5 being indicated generally at 21. As shown therein, spring damper assembly 21 comprises a helical coil spring 22 and a generally cylindrically shaped sleeve 23 frictionally fitted thereto.

Sleeve 23 includes a radially outwardly projecting continuous annular flange portion 24 which provides a seat for coil spring 22 and in turn a smooth continuous surface for engagement with the seat 25 provided on the head 26. A pair of integrally formed circumferentially extending sidewalls 27 and 28 extend axially from the inner periphery of flange portion 24 and opposite circumferential edges of walls 27 and 28 are positioned in spaced opposed relationship so as to define a pair of axially extending diametrically opposed slots 29 (only one of which is shown). The axial end of each of the sidewalls 27 and 28 is flared radially inwardly in order to avoid any marring or nicking of the inner surfaces of the coil spring 22 both during assembly as well as operation thereof.

In like manner to that described above sleeve 23 will preferably be sized relative to the inside diameter of coil spring 22 so as to provide a frictional engagement between the inner periphery of the spring coil and the outer surfaces of the sidewalls. This frictional engagement will operate to alter the resonant frequency of coil spring 22 whereby the potential for resonant oscillation thereof is minimized if not totally eliminated. Further, because annular flange portion 24 provides a smooth relatively flat continuous annular surface engaging the recessed spring seat provided in the head, the potentially damaging effects due to excessive wear resulting from the inherent rotational movement of the spring damper assembly of this seating surface are substantially eliminated.

Thus, as may now be apparent the present invention is well suited for any application wherein spring resonance is a potential problem and is particularly adapted for applications where the spring is seated against a comparatively soft alloy surface such as for example cast aluminum alloy heads used in internal combustion engines.

While it will be apparent that the preferred embodiments of the invention disclosed are well calculated to provide the advantages and features above stated, it will be appreciated that the invention is susceptible to modification, variation and change without departing from the proper scope or fair meaning of the subjoined claims.

I claim:
1. A helical coil spring damper assembly comprising:
   a helical coil spring interposed between a sprung member and an unsprung member, wherein said helical coil spring serves to return said sprung member to an initial position after release of an offsetting force;
   a cylindrical sleeve member positioned in coaxial relationship to said helical coil spring, received by and conforming to a radial dimension of said helical coil spring in said initial position,
   said cylindrical sleeve member extending over a portion of the axial length of said helical coil spring,
   said cylindrical member being axially rigid, allowing a portion of the coils of said helical coil spring to frictionally slide against said cylindrical sleeve member as said helical coil spring undergoes lineal dimensional variation during compression and expansion, and imparting a radially directed force resilient to radial dimensional variation of the helical coil spring as it undergoes compression and expansion, thereby damping the motion of said helical coil spring,
   said cylindrical sleeve member having a first end with a continuous annular radially extending flange portion integrally formed therewith,
   said flange portion being interposed between said helical coil spring and one of said spring and unsprung members,
   and said cylindrical member having a second end which is open.
2. A helical coil spring and damper assembly as recited in claim 1, wherein said cylindrical member conforms to the outside radial dimension of said helical coil spring in said initial position.
3. A helical coil spring and damper assembly as recited in claim 1, wherein said cylindrical member conforms to the inside radial dimension of said helical coil spring in said initial position.

4. A helical coil spring and damper assembly as recited in claim 1, wherein said second end is flared radially away from said coil spring.

5. A helical coil spring and damper assembly as recited in claim 1, wherein said cylindrical member has an axially extending slot, thereby allowing said cylindrical member to radially flex about its axis.

6. A valve assembly for an internal combustion engine comprising:
   a valve member;
   said valve member having a valve head, seated about a port on the engine head,
   said valve member having a valve stem extending from said valve head,
   said valve stem having a helical coil spring seat,
   said engine head and said helical coil spring seat having a helical coil spring interposed therebetween, biasing said valve member to an initial position, such that said valve head closes said port after release of an offsetting force imparted by a valve actuator,
   a cylindrical sleeve member conforming to a radial dimension of said helical coil spring in said initial position,
   said cylindrical sleeve member extending axially over a portion of the coils of said helical coil spring,
   said cylindrical sleeve member being radially resilient allowing a portion of said coils of said helical coil spring to frictionally slide against said cylindrical sleeve member as said helical coil spring undergoes lineal dimensional variation during compression and expansion, and imparting a radially directed force resiliently resisting radial dimensional variation as said helical coil spring undergoes compression and expansion, thereby damping the motion of said helical coil spring,
   said cylindrical sleeve member having a continuous annular radially extending flange portion at one end thereof, said flange portion being interposed between said helical coil spring and said engine head whereby excessive wear of said engine head due to rotational movement of said cylindrical sleeve member is substantially eliminated, and
   said cylindrical sleeve member having a second end which is open.

7. A valve assembly for an internal combustion engine as recited in claim 6 wherein said cylindrical sleeve member conforms to the outside radial dimension of said helical coil spring in said initial position.

8. A valve assembly for an internal combustion engine as recited in claim 6 wherein said cylindrical sleeve member conforms to the inside radial dimension of said helical coil spring in said initial position.

9. A valve assembly for an internal combustion engine as recited in claim 6 wherein said second end has a radially extending taper opposite the radial direction of said helical coil spring.

10. A valve assembly for an internal combustion engine as recited in claim 6 wherein said cylindrical member has a longitudinal extending slot thereby allowing said cylindrical sleeve member to radially flex about its longitudinal axis.

11. An improved spring damper assembly comprising:
   a helical coil spring,
   a generally cylindrical shaped sleeve member frictionally fitted to said spring and operative to frictionally dampen oscillatory movement of said spring whereby the resonance of said spring is attenuated,
   said sleeve member including a continuous annular radially extending flange portion overlying one axial end of said spring and being operative to inhibit excessive wear of a surface against which said spring damper assembly is intended to bear.

* * * * *